US012689020B2

(12) United States Patent (10) Patent No.: US 12,689,020 B2

Maruo et al. (45) Date of Patent: Jul. 21, 2026

(54) ELECTRODE SHEET MANUFACTURING DEVICE

(71) Applicant: Prime Planet Energy & Solutions, Inc., Tokyo (JP)

(72) Inventors: Tetsumasa Maruo, Ibaraki (JP); Shun Yamazaki, Himeji (JP); Shota Hirohata, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 233 days.

(21) Appl. No.: 18/736,070

(22) Filed: Jun. 6, 2024

(65) Prior Publication Data

US 2024/0408657 A1 Dec. 12, 2024

(30) Foreign Application Priority Data

Jun. 9, 2023 (JP) ................................. 2023-095376

(51) Int. Cl.
| | |
|---|---|
| *H01M 4/04* | (2006.01) |
| *B21B 1/24* | (2006.01) |
| *B21B 37/42* | (2006.01) |
| *B21B 37/74* | (2006.01) |
| B21B 37/38 | (2006.01) |
| B21B 37/58 | (2006.01) |

(52) U.S. Cl.
CPC ............. *H01M 4/0435* (2013.01); *B21B 1/24* (2013.01); *B21B 37/42* (2013.01); *B21B 37/74* (2013.01); *B21B 37/38* (2013.01); *B21B 37/58*

(2013.01); *B21B 2261/04* (2013.01); *B21B 2261/20* (2013.01); *B21B 2267/12* (2013.01)

(58) Field of Classification Search
CPC ...................................................... B21B 37/38
See application file for complete search history.

(56) References Cited

U.S. PATENT DOCUMENTS

2023/0361265 A1 11/2023 Kim et al.

FOREIGN PATENT DOCUMENTS

| | | | |
|---|---|---|---|
| CN | 109244356 A | 1/2019 | |
| JP | 2000233298 A * | 8/2000 | |
| JP | 2006-175501 A | 7/2006 | |
| JP | 2006-179401 A | 7/2006 | |
| JP | 3937561 B2 * | 6/2007 | ............... B30B 3/04 |
| JP | 2013-111647 A | 6/2013 | |
| JP | 2014-173996 A | 9/2014 | |
| JP | 2017-91649 A | 5/2017 | |
| JP | 2017-091649 A | 5/2017 | |
| KR | 10-2022-0098492 A | 7/2022 | |

* cited by examiner

*Primary Examiner* — Atul P. Khare

(74) *Attorney, Agent, or Firm* — Finnegan, Henderson, Farabow, Garrett and Dunner, LLP

(57) ABSTRACT

An electrode sheet manufacturing device includes a pair of rolls that press an electrode active material layer formed on an electrode sheet, a press pressure adjusting mechanism that adjusts a press pressure of the pair of rolls, a temperature sensor that detects a surface temperature of at least one of the pair of rolls, and a controller. The controller is configured to adjust the press pressure, based on the surface temperature of the at least one of the pair of rolls detected by the temperature sensor.

6 Claims, 4 Drawing Sheets

AMOUNT OF
CHANGE IN
TEMPERATURE

AMOUNT OF CHANGE IN THICKNESS OF ELECTRODE SHEET

ELECTRODE SHEET MANUFACTURING DEVICE

CROSS REFERENCE OF RELATED APPLICATION

The present application claims the priority based on Japanese Patent Application No. 2023-095376 filed on Jun. 9, 2023, the entire contents of which are incorporated in the present specification by reference.

BACKGROUND

The present disclosure relates to a manufacturing device for an electrode sheet of an electricity storage device.

For example, in Japanese Laid-open Patent Publication No. 2006-179401, a press roll device that causes a metal web of an electrode for a secondary battery to continuously pass between upper and lower press rolls to press the web is disclosed. The press roll device described in Japanese Laid-open Patent Publication No. 2006-179401 includes an in-line film thickness gauge that continuously measures a thickness of a web and is configured to increase a bend pressure by a predetermined amount each time it is confirmed that the thickness of the web is reduced by a predetermined amount. The bend pressure is a pressure that is applied in an opposite direction to a direction in which a press pressure is applied, and a gap between the upper and lower press rolls is expanded by increasing the bend pressure. According to Japanese Laid-open Patent Publication No. 2006-179401, gradual reduction of the thickness of the web can be suppressed by increasing the bend pressure. The gap between the upper and lower press rolls is gradually reduced due to thermal expansion deformation of the press rolls.

The press roll device disclosed in Japanese Laid-open Patent Publication No. 2006-179401 includes a preheat roll that heats the web before performing pressing by the press rolls. According to Japanese Laid-open Patent Publication No. 2006-179401, as pressing progresses, heat is generated in a bearing portion of each of the press rolls and the heat is transferred to both of end portions of the press roll. According to Japanese Laid-open Patent Publication No. 2006-179401, since the web is warmed up by the preheat roll, local thermal expansion deformation of only both of end portions of each of the upper and lower press rolls can be corrected. Thus, the gap between the upper and lower press rolls and the press pressure can be kept substantially uniform in a width direction of the web and, as a result, variations in thickness of the web in the width direction can be eliminated.

For example, in Japanese Laid-open Patent Publication No. 2013-111647, a roll press facility including a thickness gauge that measures a thickness of a compressed material at multiple positions in a width direction is disclosed. According to Japanese Laid-open Patent Publication No. 2013-111647, the thickness of the material can be maintained in a target range at any position in the width direction by adjusting a press cylinder position and a bend cylinder pressure based on the thicknesses of the material measured at the multiple positions in the width direction.

In Japanese Laid-open Patent Publication No. 2014-173996, a roll press facility including a measuring sensor that measures a deformation amount of a roll separately for deformation due to temperature change of the roll and for deformation due to a load on the roll is disclosed. According to Japanese Laid-open Patent Publication No. 2014-173996, it is allowed to accurately grasp shape change of a roll, and highly precise management of the roll is enabled.

In each of Japanese Laid-open Patent Publication No. 2006-179401, Japanese Laid-open Patent Publication No. 2013-111647, and Japanese Laid-open Patent Publication No. 2014-173996, a problem in that the roll is deformed through thermal expansion by heat generated at the bearing portion of the roll and a thickness of a sheet-like material is changed is described. To solve the problem, in the devices described in Japanese Laid-open Patent Publication No. 2006-179401 and Japanese Laid-open Patent Publication No. 2013-111647, the thickness of the sheet-like material is controlled to a target thickness by adjusting a press condition, based on measurement of the thickness of the sheet-like material. In the device described in Japanese Laid-open Patent Publication No. 2014-173996, the thickness of the sheet-like material is made to be a target thickness by managing dimensions of the rolls that press the sheet-like material.

SUMMARY

The inventors of the present application found that, in a case where an electrode sheet on which an electrode active material layer is formed is pressed, a thickness of the electrode sheet is changed from the thickness thereof immediately after pressing in some cases. Therefore, there is a probability that the thickness of the electrode sheet cannot be controlled well by adjusting a press condition based on measurement of the thickness of the electrode sheet, in some cases.

Herein, an electrode sheet manufacturing device that includes a pair of rolls that press an electrode sheet and can control a thickness of the electrode sheet will be proposed.

An electrode sheet manufacturing device disclosed herein includes a pair of rolls that press an electrode active material layer formed on an electrode sheet, a press pressure adjusting mechanism that adjusts a press pressure of the pair of rolls, a temperature sensor that detects a surface temperature of at least one of the pair of rolls, and a controller. The controller is configured to adjust the press pressure, based on the surface temperature of the at least one of the pair of rolls detected by the temperature sensor.

According to the electrode sheet manufacturing device described above, the thickness of the electrode sheet can be controlled by detecting the surface temperature of the roll and adjusting the press pressure of the roll based on the detected temperature.

DETAILED DESCRIPTION OF THE PREFERRED EMBODIMENTS

Preferred embodiments of a manufacturing device for an electrode sheet of an electricity storage device will be described below. Note that, as a matter of course, the preferred embodiments described herein are not intended to be particularly limiting the present disclosure. The accompanying drawings are schematic and do not necessarily reflect an actual implemented product.

[Configuration of Electrode Sheet Manufacturing Device]

Figure 1:
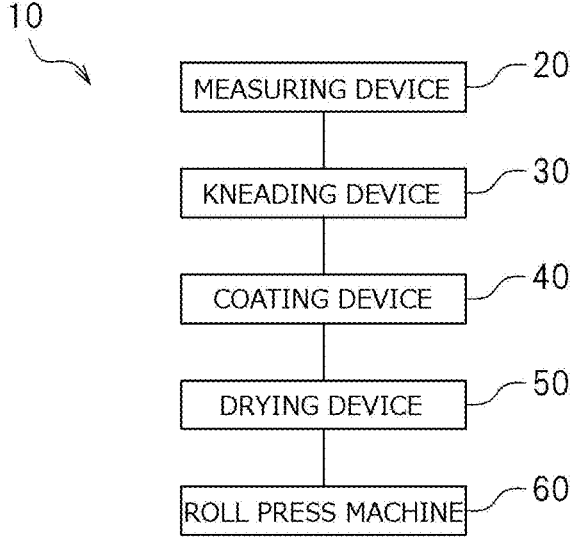
FIG. 1 is a schematic diagram of an electrode sheet manufacturing device.

FIG. 1 is a schematic diagram of an electrode sheet manufacturing device 10 according to a preferred embodiment. The electrode sheet manufacturing device 10 is herein a device used for manufacturing an electrode sheet 1 of a lithium-ion secondary battery (see FIG. 2). However, the electrode sheet 1 is not limited to the electrode sheet 1 of the lithium-ion secondary battery, and may be an electrode sheet of any one of various known electricity storage devices. The term "electricity storage device" generally refers to devices from which electric energy can be taken out and encompasses so-called electricity storage batteries (chemical batteries), such as a lithium-ion secondary battery, a nickel hydrogen battery, or the like and capacitors (physical batteries), such as an electric double-layered capacitor or the like.

The electrode sheet 1 includes a band-like electrode foil 2 and an electrode active material layer 3 formed on the electrode foil 2. The electrode sheet 1 is configured such that the electrode active material layer 3 including an electrode active material is formed on a surface of the band-like electrode foil 2 having a width and a thickness that are determined in advance. In a lithium-ion secondary battery, when the electrode sheet 1 is a positive electrode sheet, the electrode foil 2 is, for example, an aluminum foil. The electrode active material (positive electrode active material) is a material that, like a lithium transition metal composite material, can discharge lithium ions during charging and absorb lithium ions during discharging. In a case where the electrode sheet 1 is a negative electrode sheet, the electrode foil 2 is, for example, a copper foil. The electrode active material (negative electrode active material) is a material that, like natural graphite, can absorb lithium ions during charging and discharge lithium ions absorbed during charging during discharging. As to the positive electrode active material and the negative electrode active material, various other materials than the materials described above have been proposed and there is no particular limitation.

As illustrated in FIG. 1, the electrode sheet manufacturing device 10 includes a measuring device 20, a kneading device 30, a coating device 40, a drying device 50, and a roll press machine 60.

The measuring device 20 measures each material of the electrode active material layer 3. Measured materials of the electrode active material layer 3 are mixed and kneaded by the kneading device 30. The materials of the electrode active material layer 3 that have been kneaded to be made into a slurry state are applied to the electrode foil 2 by the coating device 40. The drying device 50 dries the materials of the electrode active material layer 3 in a slurry state that have been applied to the electrode foil 2. The roll press machine 60 presses the electrode sheet 1 to adjust a thickness of the electrode active material layer 3 to a thickness in a predetermined range.

Figure 2:
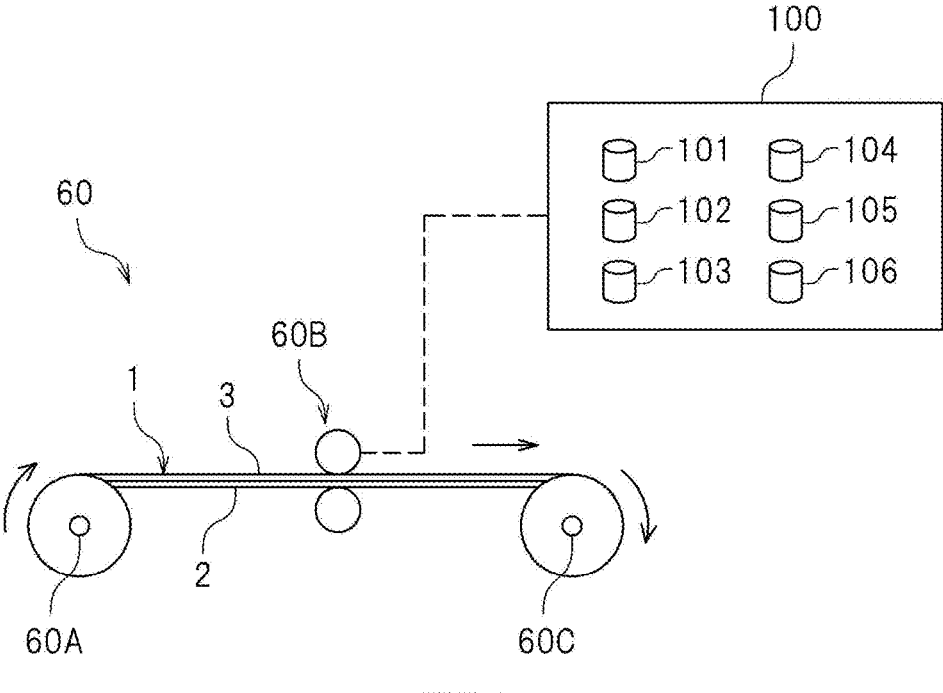
FIG. 2 is a schematic side view of a roll press machine.

FIG. 2 is a schematic side view of the roll press machine 60. As illustrated in FIG. 2, the roll press machine 60 according to this preferred embodiment includes an unwinding device 60A, a press device 60B, and a winding device 60C. The electrode sheet 1 after the electrode active material layer 3 is dried is supplied to the unwinding device 60A by a roll. The winding device 60C winds the electrode sheet 1 that has been unwound from the unwinding device 60A and pressed by the press device 60B. The roll press machine 60 includes a controller 100 that controls operations of the unwinding device 60A, the press device 60B, and the winding device 60C.

Figure 3:
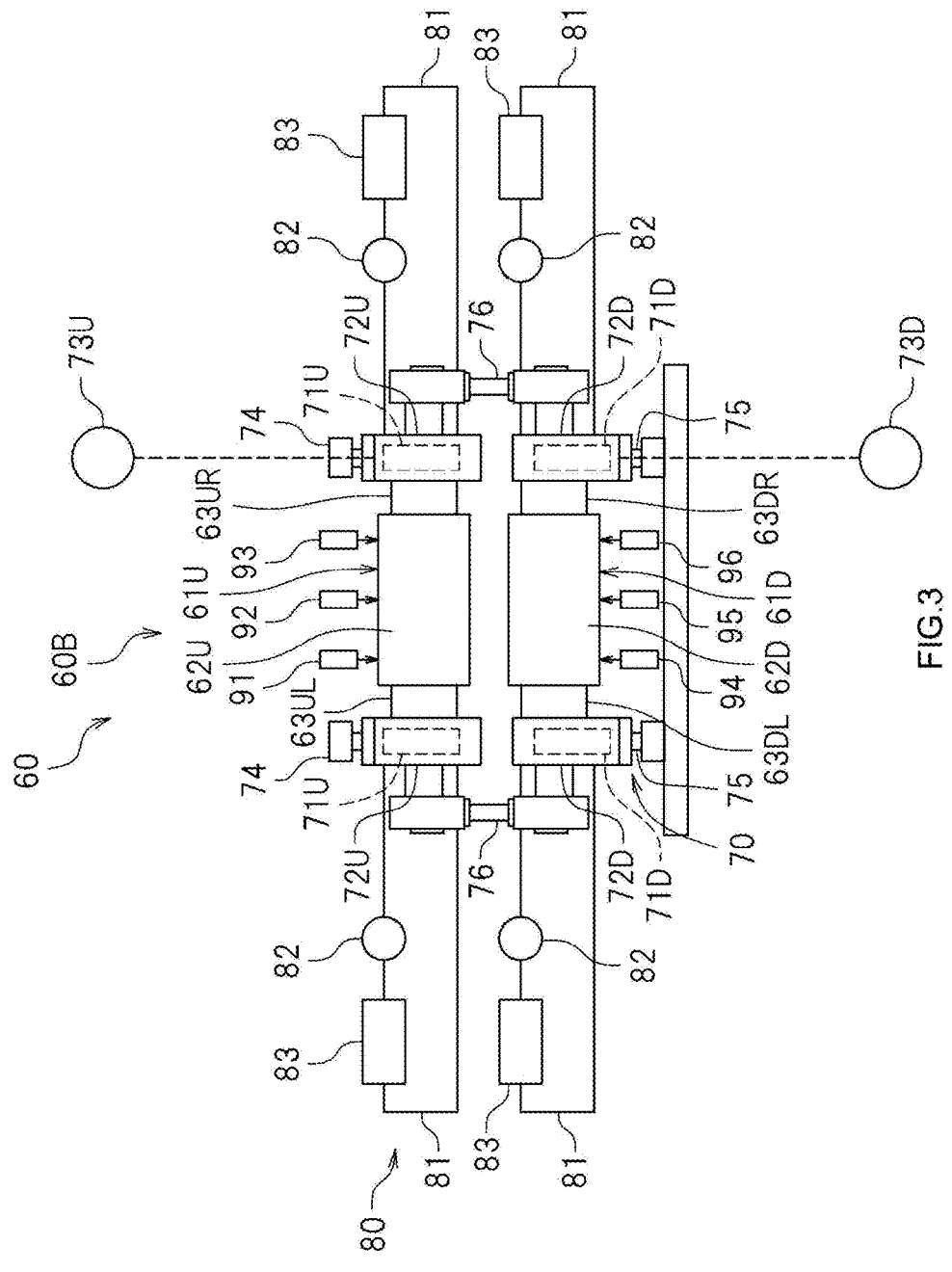
FIG. 3 is a schematic front view of a press device.

FIG. 3 is a schematic front view of the press device 60B. As illustrated in FIG. 3, the press device 60B includes a pair of press rolls 61U and 61D that press the electrode active material layer 3 formed on the electrode sheet 1, a press pressure adjusting mechanism 70 that adjusts a press pressure of the pair of press rolls 61U and 61D, a coolant supplying device 80 that supplies a coolant to the press rolls 61U and 61D, and temperature sensors 91 to 96 that detect surface temperatures of the press rolls 61U and 61D.

The pair of press rolls 61U and 61D face each other in a thickness direction of the electrode sheet 1 (herein, in an up-down direction). The upper press roll 61U includes a roll body portion 62U that contacts and presses the electrode sheet 1. Shaft portions 63UL and 63UR are coupled to both sides of the roll body portion 62U. Each of the shaft portions 63UL and 63UR is arranged at a more outer side than the electrode sheet 1 in a width direction and has a smaller diameter than that of the roll body portion 62U. The shaft portions 63UL and 63UR do not contact the electrode sheet 1. The lower press roll 61D includes similar roll body portion 62D and shaft portions 63DL and 63DR.

There is no limitation on materials of the press rolls 61U and 61D. For example, a material having high hardness, such as a high carbon content bearing steel material (SUJ material) and alloy tool steel (SKD material), is used as a material of the press rolls 61U and 61D. There is no limitation on a size of the press rolls 61U and 61D. When the press rolls 61U and 61D are large, each of the press rolls 61U and 61D has, for example, a diameter of about 800 mm and a length of about 1000 mm. For example, based on calculations, when each of the press rolls 61U and 61D is formed of SUJ2 and has a diameter of 800 mm, a space between the press rolls 61U and 61D reduces by about 0.01 mm as a temperature increases by 1° C.

The press pressure adjusting mechanism 70 includes a pair of upper bearings 71U that support the upper press roll 61U, a pair of upper shaft boxes 72U in each of which a corresponding one of the pair of upper bearings 71U is stored, a pair of lower bearings 71D that support the lower press roll 61D, a pair of lower shaft boxes 72D in each of which a corresponding one of the lower bearings 71D is stored, an upper drive device 73U that rotates the upper press roll 61U, a lower drive device 73D that rotates the lower press roll 61D, a pair of gap adjusting screws 74, a pair of press cylinders 75, and a pair of bend cylinders 76.

Each of the pair of upper bearings 71U rotatably supports a corresponding one of the shaft portions 63UL and 63UR of the upper press roll 61U. When the upper press roll 61U is rotated under application of a press pressure, heat is generated by friction between the shaft portions 63UL and 63UR of the upper press roll 61U and the pair of the upper bearings 71U. An influence of the heat will be described later. An unillustrated transmission member coupled to the upper drive device 73U and a mating transmission member (not illustrated) coupled to one (for example, the shaft portion 63UR) of the shaft portions of the upper press roll 61U and engaged with the transmission member described above are also stored in one of the upper shaft boxes 72U. The upper drive device 73U is, for example, an electric motor. The transmission members are, for example, gears.

Each of the pair of lower bearings 71D rotatably supports a corresponding one of the shaft portions 63DL and 63DR of the lower press roll 61D. An unillustrated transmission member coupled to the lower drive device 73D and a mating transmission member (not illustrated) coupled to one (for example, the shaft portion 63DR) of the shaft portions of the lower press roll 61D are stored in one of the lower shaft boxes 72D.

The pair of gap adjusting screws 74 adjust a position of the upper press roll 61U in the up-down direction. A gap between the upper press roll 61U and the lower press roll 61D can be adjusted by rotating the gap adjusting screws 74. However, the gap adjusting screws 74 may not be provided. In that case, the gap between the upper press roll 61U and the lower press roll 61D may be adjusted by an operation of the press cylinders 75.

The pair of press cylinders 75 press the lower press roll 61D toward the upper press roll 61U. The pair of press cylinders 75 support the pair of lower bearings 71D and move the lower bearings 71D in the up-down direction. The electrode sheet 1 sandwiched between the pair of the press rolls 61U and 61D is pressed by driving of the pair of press cylinders 75. The pair of press cylinders 75 is one of devices that adjust a press pressure that presses the electrode sheet 1. In this preferred embodiment, the term "press pressure" means a pressure obtained by synthesizing a bend pressure that will be described later and a pressure generated by the press cylinders 75. To distinguish from the "press pressure," the pressure generated by the press cylinders 75 will be hereinafter also referred to as a "cylinder press pressure." The press cylinders 75 are one example of a lifting device that lifts and lowers one of the pair of press rolls 61U and 61D with respect to the other one of the pair of press rolls 61U and 61D. The gap between the pair of press rolls 61U and 61D can be adjusted with the cylinder press pressure by driving the press cylinders 75. Note that the lifting device may be configured to press the upper press roll 61U toward the lower press roll 61D. Alternatively, the lifting device may be configured to lower the upper press roll 61U and lift the lower press roll 61D.

The pair of bend cylinders 76 is also one of devices that adjust the press pressure of the press device 60B. The pair of bend cylinders 76 are arranged between the shaft portion 63UL of the upper press roll 61U and the shaft portion 63DL of the lower press roll 61D and between the shaft portion 63UR of the upper press roll 61U and the shaft portion 63DR of the lower press roll 61D. The pair of bend cylinders 76 press the press rolls 61U and 61D in an opposite direction to a direction in which the press pressure is applied by the press cylinders 75. Thus, the press rolls 61U and 61D are bent or bending thereof is corrected. As a result, the gap between the press rolls 61U and 61D and the press pressure are adjusted. The gap between the press rolls 61U and 61D and the press pressure are adjusted at each of left and right sides by independently controlling the bend pressure at each of the bend cylinders 76 at the left and right sides. The pair of bend cylinders 76 are one example of bend devices that bend the press rolls 61U and 61D. As used herein, the expression "bend the press rolls 61U and 61D" can encompass a case where the press rolls 61U and 61D are bent such that the press rolls 61U and 61D bent by driving of the press cylinders 75 are corrected. Each of the pair of bend cylinders 76 is configured to adjust the bend pressure that bends a corresponding one of the press rolls 61U and 61D.

The coolant supplying device 80 supplies the coolant to the pair of upper shaft boxes 72U and the pair of lower shaft boxes 72D. The coolant circulates in four circulation flow passages 81 each including a corresponding one of the upper shaft boxes 72U, the other one of the upper shaft boxes 72U, one of the lower shaft boxes 72D, and the other one of the lower shaft boxes 72D. A pump 82 and a cooling device 83 are provided in each of the circulation flow passages 81. The coolant circulates in the circulation flow passages 81 by driving of the pump 82 and takes heat from the bearing 71U or 71D when passing through the bearing 71U or 71D. The coolant whose temperature has risen due to heat taking is cooled down by the cooling device 83. The pump 82 is configured to adjust circulation speed of the coolant. The coolant supplying device 80 adjusts an amount (amount per unit time) of the coolant supplied to the shaft boxes 72U and 72D by controlling the pump 82 and adjusting the circulation speed of the coolant.

Each of the temperature sensors 91 to 93 (which will be hereinafter also referred to as the "first to third temperature sensors 91 to 93) detects a surface temperature of the upper press roll 61U. The first to third temperature sensors 91 to 93 are arranged above the upper press roll 61U herein. The first to third temperature sensors 91 to 93 are separated from the upper press roll 61U. The first to third temperature sensors 91 to 93 are non-contact type temperature sensors, for example, infrared temperature sensors. However, the first to third temperature sensors 91 to 93 may be contact type temperature sensors. The first to third temperature sensors 91 to 93 may be arranged in front of or behind the upper press roll 61U or at some other position.

The first temperature sensor 91 is provided at a leftmost position among the first to third temperature sensors 91 to 93 and detects a surface temperature of a left end portion of the upper press roll 61U. The second temperature sensor 92 is provided at a right side of the first temperature sensor 91 and detects a surface temperature of a central portion of the upper press roll 61U. The third temperature sensor 93 is provided at a rightmost position among the first to third temperature sensors 91 to 93 and detects a surface temperature of a right end portion of the upper press roll 61U. As used herein, the "end portion" of the upper press roll 61U means an actual end portion of the press roll 61U, and herein, means an end portion of the roll body portion 62U. The "end portion" of the upper press roll 61U is, for example, an area at each of both ends when the roll body portion 62U is equally divided into three in an axial direction. The "central portion" of the upper press roll 61U is, for example, an area in middle when the roll body portion 62U is equally divided into three in the axial direction. The expression "detect the temperature of the end portion or the central portion" means measuring a temperature at least at one point among the end portions and the central portion.

Each of the temperature sensors 94 to 96 (which will be hereinafter also referred to as fourth to sixth temperature sensors 94 to 96) detects a surface temperature of the lower press roll 61D. The fourth to sixth temperature sensors 94 to 96 are arranged below the lower press roll 61D herein. However, the fourth to sixth temperature sensors 94 to 96 may be arranged in front of or behind the lower press roll 61D or at some other position. The fourth to sixth temperature sensors 94 to 96 are also non-contact type temperature sensors.

The fourth temperature sensor 94 is provided at a leftmost position among the fourth to sixth temperature sensors 94 to 96 and detects a surface temperature of a left end portion of the lower press roll 61D (the roll body portion 62D). The fifth temperature sensor 95 is provided at a right side of the fourth temperature sensor 94 and detects a surface temperature of a central portion of the lower press roll 61D (the roll body portion 62D). The sixth temperature sensor 96 is provided at a rightmost position among the fourth to sixth temperature sensors 94 to 96 and detects a surface temperature of a right end portion of the lower press roll 61D (the roll body portion 62D).

The controller 100 is configured to adjust the press pressure, based on the surface temperatures of the press rolls 61U and 61D detected by the temperature sensors 91 to 96. Herein, the controller 100 adjusts, based on the temperatures detected by the temperature sensors 91 to 96, the bend pressure with which the bend cylinders 76 bends the press rolls 61U and 61D. Specifically, the controller 100 stores correlation data between the temperatures that are detected by the temperature sensors 91 to 96 and a thickness of the electrode sheet 1 in advance. The controller 100 adjusts, based on the correlation data, the bend pressure with which the bend cylinders 76 bends the press rolls 61U and 61D. Correlation data between an amount of change in the bend pressure and an amount of change in the thickness of the electrode sheet 1 is also recorded in the controller 100 in advance. The controller 100 reduces variations in thickness of the electrode sheet 1 in the width direction to make the thickness uniform by adjusting the bend pressure.

As illustrated in FIG. 2, the controller 100 includes a first storage 101 in which the correlation data between the temperatures that are detected by the temperature sensors 91 to 96 and the thickness of the electrode sheet 1 is stored and a second storage 102 in which the correlation data between the amount of change in the bend pressure and the amount of change in the thickness of the electrode sheet 1 is stored. The controller 100 further includes a bend pressure controller 103 that adjusts, based on the correlation data stored in the first storage 101 and the correlation data stored in the second storage 102, the bend pressure with which the bend cylinders 76 bend the press rolls 61U and 61D.

The thickness of the electrode sheet 1 of the correlation data is a thickness actually measured after a pressing step ends. The thickness of the electrode sheet 1 is increased to a larger thickness than the thickness thereof immediately after pressing, for example, by spring back of the electrode sheet 1 in some cases. Therefore, the gap between the upper press roll 61U and the lower press roll 61D is not the same as the thickness of the electrode sheet 1 after the pressing step in some cases. Therefore, the correlation data is created based on the thickness of the electrode sheet 1 actually measured after the pressing step ends.

The controller 100 controls the press cylinders 75, based on the temperatures that are detected by the temperature sensors 91 to 96, to adjust the press pressure. Specifically, the controller 100 performs that control based on the above-described correlation data between the temperatures that are detected by the temperature sensors 91 to 96 and the thickness of the electrode sheet 1. Thus, the controller 100 makes a thickness of each portion of the electrode sheet 1 in the width direction to a thickness in a predetermined range. Correlation data between an amount of change in the cylinder press pressure and an amount of change in the electrode sheet 1 is also recorded in the controller 100 in advance. As illustrated in FIG. 2, the controller 100 includes a third storage 104 in which correlation data between the amount of change in the cylinder press pressure and an amount of change in the thickness of the electrode sheet 1 is stored and a press pressure controller 105 that controls the press cylinders 75, based on the temperatures that are detected by the temperature sensors 91 to 96, to adjust the cylinder press pressure.

Furthermore, the controller 100 adjusts an amount of the coolant supplied from the coolant supplying device 80, based on the temperatures that are detected by the temperature sensors 91 to 96. Specifically, the controller 100 controls the pumps 82 to adjust supply speed of the coolant. As illustrated in FIG. 2, the controller 100 further includes a coolant controller 106 that controls the pumps 82, based on the temperatures that are detected by the temperature sensors 91 to 96, to adjust the amount of the coolant supplied from the coolant supplying device 80. Thus, the controller 100 makes the temperatures of the press rolls 61U and 61D closer to a temperature determined in advance and reduces a temperature difference depending on positions of the press rolls 61U and 61D. Herein, the controller 100 independently controls each of the pumps 82.

[Control of Thickness of Electrode Sheet]

An example of control of the thickness of the electrode sheet 1 by the roll press machine 60 will be described below. In order to facilitate control of the thickness of the electrode sheet 1, the roll press machine 60 suppresses increase of the temperatures of the press rolls 61U and 61D by causing the coolant to flow. When the temperatures of the press rolls 61U and 61D increase, the press rolls 61U and 61D thermally expand, and the gap between the press rolls 61U and 61D is reduced. Thus, the thickness of the electrode sheet 1 is reduced. Reduction of the thickness of the electrode sheet 1 can be suppressed by suppressing increase of the temperatures of the press rolls 61U and 61D. When the temperatures of the press rolls 61U and 61D increase, the roll press machine 60 increases the amount of the coolant supplied. When the temperatures of the press rolls 61U and 61D increase even while cooling is performed, the roll press machine 60 controls the thickness of the electrode sheet 1 by controlling the bend pressure and the cylinder press pressure.

Figure 4:
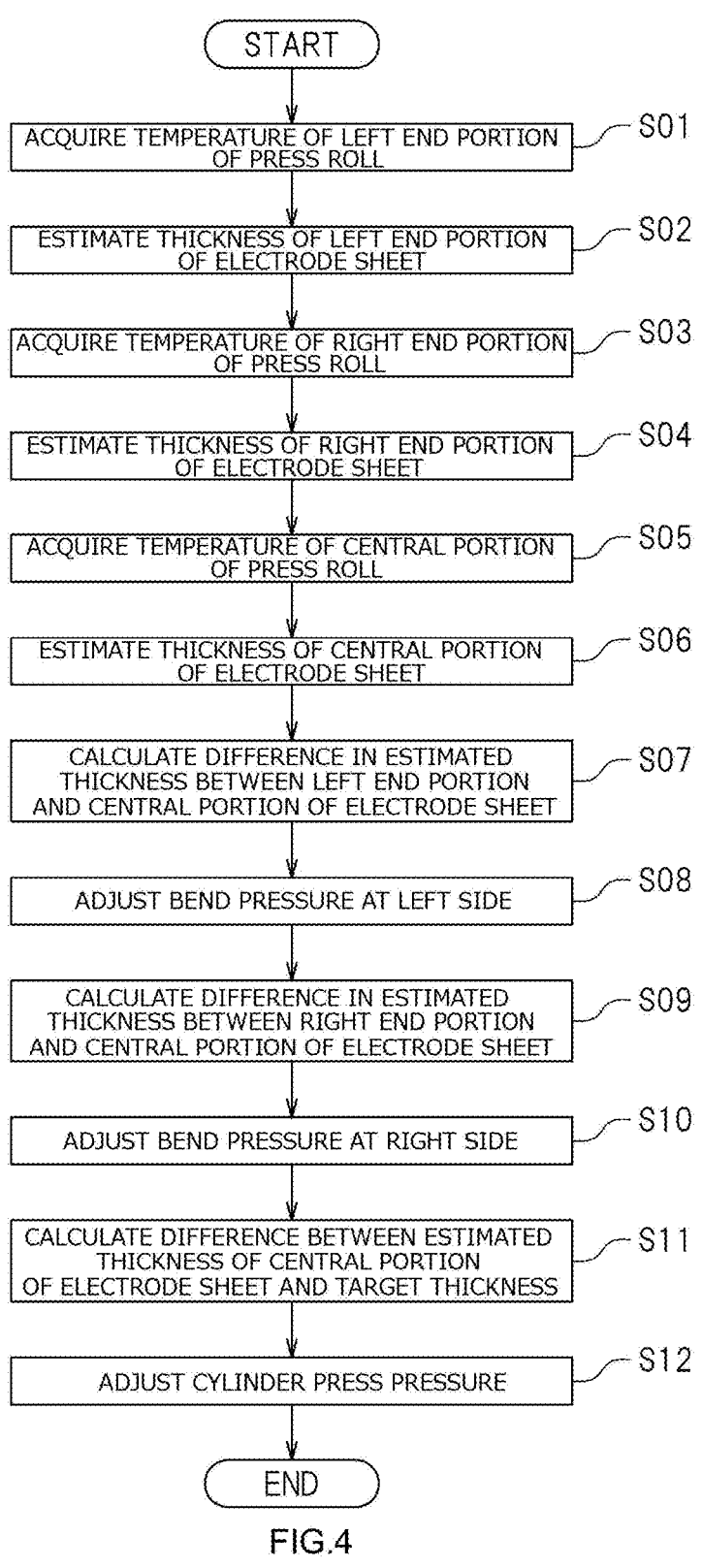
FIG. 4 is a flowchart illustrating processes of control of a thickness of an electrode sheet by controlling a bend pressure and a cylinder press pressure.
Figure 5:
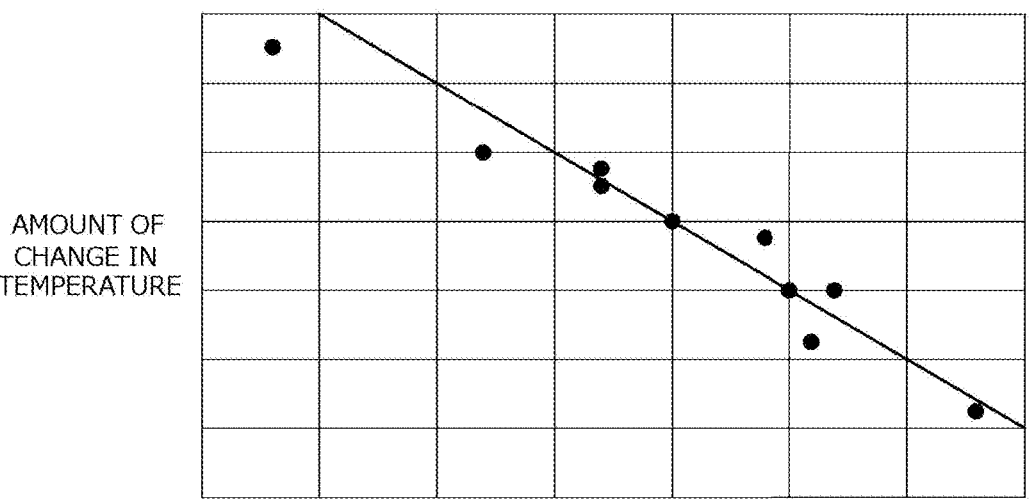
FIG. 5 is a graph illustrating an example of correlation data between an amount of change in temperature of a press roll and an amount of change in the thickness of the electrode sheet.

FIG. 4 is a flowchart illustrating processes of control of the thickness of the electrode sheet 1 by controlling the bend pressure and the cylinder press pressure. As illustrated in FIG. 4, in Step S01 of control of the thickness of the electrode sheet 1, the roll press machine 60 acquires temperatures of the left end portions of the press rolls 61U and 61D measured by the first temperature sensor 91 and the fourth temperature sensor 94. In Step S02, a thickness of a left end portion of the electrode sheet 1 is estimated from the acquired temperatures of the left end portions of the press rolls 61U and 61D, based on the correlation data stored in the first storage 101. FIG. 5 illustrates an example of the correlation data between the temperature and the thickness of the electrode sheet 1, more specifically, the correlation data between an amount of change in the temperatures of the press rolls 61U and 61D and the amount of change in the thickness of the electrode sheet 1. As illustrated in FIG. 5, as the temperatures of the press rolls 61U and 61D increase, an estimated thickness of the electrode sheet 1 reduces. In this case, as the temperatures of the left end portions of the press rolls 61U and 61D increase, the estimated thickness of the left end portion of the electrode sheet 1 reduces.

In Step S03, similar to the left end portions, the roll press machine 60 acquires temperatures of right end portions of the press rolls 61U and 61D measured by the third temperature sensor 93 and the sixth temperature sensor 96. In subsequent Step S04, a thickness of a right end portion of the electrode sheet 1 is estimated from the acquired temperatures of the right end portions of the press rolls 61U and 61D, based on the correlation data stored in the first storage 101. As the temperatures of the right end portions of the press rolls 61U and 61D increase, the estimated thickness of the right end portion of the electrode sheet 1 reduces.

In Step S05, the roll press machine 60 acquires temperatures of the central portions of the press rolls 61U and 61D measured by the second temperature sensor 92 and the fifth temperature sensor 95. In Step S06, a thickness of a central portion of the electrode sheet 1 is estimated from the acquired temperatures of the central portions of the press rolls 61U and 61D, based on the correlation data stored in the first storage 101. Heat is generated mainly by friction between the press rolls 61U and 61D and the bearings 71U and 71D. Therefore, the temperatures of the central portions of the press rolls 61U and 61D are normally lower than the temperatures of the end portions. The estimated thickness of the central portion of the electrode sheet 1 is normally larger than the estimated thicknesses of the end portions. Note that an order in which a set of Steps S01 and S02, a set of Steps S03 and S04, and a set of Steps S05 and S06 are performed may be changed.

In Step S07, the roll press machine 60 obtains a difference between the estimated thickness of the left end portion of the electrode sheet 1 and the estimated thickness of the central portion of the electrode sheet 1. In Step S08, based on correlation data recorded in the second storage 102, the bend pressure of the bend cylinders 76 at the left side is adjusted such that the difference obtained in Step S07 is eliminated. The larger the difference between the thickness of the left end portion of the electrode sheet 1 and the thickness of the central portion of the electrode sheet 1 that have been estimated is, the larger the bent pressure is set. Similarly, in Step S09, a difference between the estimated thickness of the right end portion of the electrode sheet 1 and the estimated thickness of the central portion of the electrode sheet 1 is obtained. In Step S10, based on the correlation data recorded in the second storage 102, the bend pressure of the bend cylinders 76 at the right side is adjusted such that the difference obtained in the Step S09 is eliminated.

Furthermore, in Step S11, a difference between the thickness of the central portion of the electrode sheet 1 estimated in Step S06 and a target value of the thickness of the central portion determined in advance is obtained. In Step S12, based on the correlation data recorded in the third storage 104, the cylinder press pressure of the press cylinders 75 is adjusted such that the difference from the target value is eliminated. The smaller the estimated thickness of the central portion of the electrode sheet 1 is, the smaller the cylinder press pressure is set. Although not illustrated, Steps S01 to S12 are repeated, for example, at time intervals determined in advance. Note that an order in which a set of Steps S07 and S08, a set of Steps S09 and S10, and a set of Steps S11 and S12 are performed may be changed.

Effects of Preferred Embodiment

Effects achieved by the manufacturing device 10 for the electrode sheet 1 according to this preferred embodiment will be described below.

The manufacturing device 10 for the electrode sheet 1 according to this preferred embodiment includes the pair of press rolls 61U and 61D that press the electrode active material layer 3 formed on the electrode sheet 1, the press pressure adjusting mechanism 70 that adjusts the press pressure of the pair of press rolls 61U and 61D, the temperature sensors 91 to 96 that detect the surface temperatures of the pair of press rolls 61U and 61D, and the controller 100. The controller 100 is configured to adjust the press pressure, based on the surface temperatures of the press rolls 61U and 61D detected by the temperature sensors 91 to 96. Note that the temperature sensors may be configured to detect the surface temperature of at least one of the pair of press rolls 61U and 61D.

According to the manufacturing device 10 for the electrode sheet 1 described above, the thickness of the electrode sheet 1 can be controlled by detecting the surface temperatures of the press rolls 61U and 61D and thus adjusting the press pressure of the press rolls 61U and 61D, based on the detected temperatures.

In a known roll machine, a problem in that a thickness of an electrode sheet is changed by heat generated at a bearing portion of a press roll is coped with by measuring the thickness of the electrode sheet after pressing. Specifically, in the known roll press machine, the thickness of the electrode sheet is controlled to a target thickness of the electrode sheet by feedback-controlling a press pressure, based on measurement of the thickness of the electrode sheet after pressing. However, the inventors of the present application found that, when the electrode sheet on which at least the electrode active material layer is formed is pressed, the thickness of the electrode sheet is changed from the thickness thereof immediately after pressing, for example, by spring back of the electrode sheet in some cases. Therefore, there is a probability that the thickness of the electrode sheet cannot be controlled well by adjusting the press pressure, based on measurement of the thickness of the electrode sheet, in some cases.

In the manufacturing device 10 for the electrode sheet 1 according to this preferred embodiment, the thickness of the electrode sheet 1 after pressing is estimated based on the surface temperatures of the press rolls 61U and 61D, and the press pressure of the press rolls 61U and 61D is adjusted. Therefore, even when the thickness of the electrode sheet 1 is changed from the thickness thereof immediately after pressing, the thickness of the electrode sheet 1 can be controlled.

In this preferred embodiment, the press pressure adjusting mechanism 70 includes the bend cylinders 76 that bend the press rolls 61U and 61D. The controller 100 adjusts, based on the temperatures detected by the temperature sensors 91 to 96, the bend pressure with which the bend cylinders 76 bend the press rolls 61U and 61D. According to the configuration described above, partial change of the thickness of the electrode sheet 1 (herein, reduction of the thickness of the electrode sheet 1 in the end portions) can be suppressed by bending the press rolls 61U and 61D.

The manufacturing device 10 for the electrode sheet 1 according to this preferred embodiment further includes the coolant supplying device 80 that supplies the coolant to the press rolls 61U and 61D. The controller 100 adjusts the amount of the coolant supplied from the coolant supplying device 80, based on the temperatures that are detected by the temperature sensors 91 to 96. According to the configuration described above, increase of the temperatures of the press rolls 61U and 61D can be suppressed. Thus, reduction of the thickness of the electrode sheet 1 can be suppressed.

In this preferred embodiment, the press pressure adjusting mechanism 70 includes the press cylinders 75 that lift and lower one of the press rolls 61U and 61D with respect to the other one of the press rolls 61U and 61D (herein, lift and lower the lower press roll 61D). The controller 100 controls the press cylinders 75, based on the temperatures that are detected by the temperature sensors 91 to 96, to adjust the press pressure. According to the configuration described above, the thickness of the electrode sheet 1 can be controlled over the whole width at one time.

In this preferred embodiment, the controller 100 stores the correlation data between the temperatures that are detected by the temperature sensors 91 to 96 and the thickness of the electrode sheet 1 in advance. The controller 100 controls the press pressure adjusting mechanism 70, based on the correlation data. According to the configuration described above, control of the press pressure adjusting mechanism 70 is performed based on the correlation data between the temperatures that are detected by the temperature sensors 91 to 96 and the thickness of the electrode sheet 1. Therefore, even when the thickness of the electrode sheet 1 is changed from the thickness thereof immediately after pressing, the thickness of the electrode sheet 1 can be controlled.

More specifically, the manufacturing device 10 for the electrode sheet 1 according to this preferred embodiment includes the first to sixth temperature sensors 91 to 96. The first and fourth temperature sensors 91 and 94 detect the temperatures of the left end portions of the press rolls 61U and 61D, and the second and fifth temperature sensors 92 and 95 detect the temperatures of the central portions of the press rolls 61U and 61D. The third and sixth temperature sensors 93 and 96 detect the temperatures of the right end portions of the press rolls 61U and 61D. According to the configuration described above, the temperatures of the end portions and the central portions of the press rolls 61U and 61D are measured, so that the thicknesses of the end portions of the electrode sheet 1 in the width direction and the thickness of the central portion of the electrode sheet 1 in the width direction can be controlled together. More specifically, the controller 100 adjusts, based on the stored correlation data, the bend pressure with which the bend cylinders 76 bend the press rolls 61U and 61D. As a result, a difference in thickness between the end portions and the central portions of the electrode sheet 1 in the width direction generated by a difference in temperature between the end portions and the central portions of the press rolls 61U and 61D can be suppressed. A difference in thickness between the left end portion and the right end portion of the electrode sheet 1 generated by a difference in temperature between the left end portions and the right end portions of the press rolls 61U and 61D can be also suppressed.

In this preferred embodiment, the temperature sensors 91 to 96 are non-contact type temperature sensors. According to the configuration described above, there is no possibility that the surfaces of the press rolls 61U and 61D are damaged by contact with the temperature sensors. Accordingly, a generated foreign matter is not mixed in the electrode sheet 1, and thus, does not cause reduction of quality of the electrode sheet 1. Moreover, there is no concern that inconveniences described above occur, the press rolls 61U and 61D can be rotated at high speed. Thus, productivity of the electrode sheet 1 can be increased.

Other Preferred Embodiments

One preferred embodiment of the electrode sheet manufacturing device proposed herein has been described above. However, the preferred embodiment described above is merely an example, and an electrode sheet manufacturing device according to the present disclosure can be implemented in various other embodiments. For example, in the preferred embodiment described above, the press pressure is controlled by control of the press cylinders 75 and the bend cylinders 76, but not limited thereto. The press pressure may be controlled by control of one or more press cylinders, for example.

In the preferred embodiment described above, the coolant supplying device 80 is provided. However, if possible, the coolant supplying device 80 may not be provided.

Furthermore, the preferred embodiment described above shall not limit the present disclosure, unless specifically stated otherwise. Various changes can be made to a technology described herein, and each of components and processes described herein can be omitted as appropriate or can be combined with another one or other ones of the components and the processes as appropriate, unless a particular problem occurs.

The present specification includes disclosure set force in the following items.

Item 1: An electrode sheet manufacturing device comprising:

a pair of rolls that press an electrode active material layer formed on an electrode sheet;

a press pressure adjusting mechanism that adjusts a press pressure of the pair of rolls;

a temperature sensor that detects a surface temperature of at least one of the pair of rolls; and a controller, wherein the controller is configured to adjust the press pressure, based on the surface temperature of the at least one of the pair of rolls detected by the temperature sensor.

Item 2: The electrode sheet manufacturing device according to the item 1, wherein the press pressure adjusting mechanism includes a bend device that bends the roll, and the controller adjusts, based on the temperature detected by the temperature sensor, a bend pressure with which the bend device bends the roll.

Item 3: The electrode sheet manufacturing device according to the item 1 or 2, further comprising:

a coolant supplying device that supplies a coolant to the roll, wherein the controller adjusts, based on the temperature that is detected by the temperature sensor, an amount of the coolant that is supplied from the coolant supplying device.

Item 4: The electrode sheet manufacturing device according to any one of the items 1 to 3, wherein the press pressure adjusting mechanism includes a lifting device that lifts and lowers one of the pair of rolls with respect to the other one of the pair of rolls, and the controller controls the lifting device, based on the temperature that is detected by the temperature sensor, to adjust the press pressure.

Item 5: The electrode sheet manufacturing device according to any one of the items 1 to 4, wherein the controller stores correlation data between the temperature that is detected by the temperature sensor and a thickness of the electrode sheet in advance, and controls the press pressure adjusting mechanism based on the correlation data.

Item 6: The electrode sheet manufacturing device according to any one of the items 1 to 5, wherein the temperature sensor is a non-contact type temperature sensor.

Item 7: The electrode sheet manufacturing device according to any one of the items 1 to 6, further comprising:

another temperature sensor, wherein one of the temperature sensor and the another temperature sensor detects a temperature of an end portion of the roll, and the other one of the temperature sensor and the another temperature sensor detects a temperature of a central portion of the roll.

Item 8: The electrode sheet manufacturing device according to the item 7, wherein
the press pressure adjusting mechanism includes a bend device that bends the roll,
the controller stores correlation data between the temperature that is detected by the temperature sensor or the another temperature sensor and the thickness of the electrode sheet in advance, and adjusts, based on the correlation data, a bend pressure with which the bend device bends the roll.

What is claimed is:

1. An electrode sheet manufacturing device comprising:
a pair of rolls including a lower press roll and an upper press roll, wherein the pair of rolls press an electrode active material layer formed on an electrode sheet;
a press pressure adjusting mechanism that adjusts a press pressure of the pair of rolls, wherein the press pressure adjusting mechanism includes a pair of bend cylinders that bend the rolls, the pair of bend cylinders arranged on opposing sides of the rolls between a respective shaft portion of the upper press roll and a respective shaft portion of the lower press roll;
a temperature sensor that detects a surface temperature of at least one of the pair of rolls; and
a controller,
wherein the controller stores correlation data between the temperature detected by the temperature sensor and a thickness of the electrode sheet in advance, and
wherein the controller is configured to control the press pressure by adjusting a bend pressure with which the pair of bend cylinders bend the rolls, based on the surface temperature of the at least one of the pair of rolls detected by the temperature sensor and the correlation data.

2. The electrode sheet manufacturing device according to claim 1, further comprising:
a coolant supplying device that supplies a coolant to the rolls, wherein
the controller is further configured to adjust, based on the temperature detected by the temperature sensor, an amount of the coolant that is supplied from the coolant supplying device.

3. The electrode sheet manufacturing device according to claim 1, wherein
the press pressure adjusting mechanism includes a lifting device that lifts and lowers one of the pair of rolls with respect to the other one of the pair of rolls, and
the controller is further configured to control the lifting device, based on the temperature detected by the temperature sensor, to adjust the press pressure.

4. The electrode sheet manufacturing device according to claim 1, wherein
the temperature sensor is a non-contact type temperature sensor.

5. The electrode sheet manufacturing device according to claim 1, wherein the temperature sensor is a first temperature sensor, and wherein the electrode sheet manufacturing device further comprises:
a second temperature sensor,
wherein
one of the first temperature sensor and the second temperature sensor detects a temperature of an end portion of at least one of the pair of rolls, and
the other one of the first temperature sensor and the second temperature sensor detects a temperature of a central portion of at least one of the pair of rolls.

6. The electrode sheet manufacturing device according to claim 5, wherein
the correlation data is further comprised of correlation data between the temperatures detected by the first and second temperature sensors and the thickness of the electrode sheet.

* * * * *